United States Patent
Taylor et al.

(10) Patent No.: US 12,248,937 B2
(45) Date of Patent: Mar. 11, 2025

(54) MOBILITY AS A SERVICE INTERFACE

(71) Applicant: Cubic Corporation, San Diego, CA (US)

(72) Inventors: Andrew John Taylor, Alexandria, VA (US); Christina Joy Ditmore, Boise, ID (US); Jonathan Rohrer, La Mesa, CA (US); Angela K. Miller, Campbell, CA (US)

(73) Assignee: Cubic Corporation, San Diego, CA (US)

( * ) Notice: Subject to any disclaimer, the term of this patent is extended or adjusted under 35 U.S.C. 154(b) by 758 days.

(21) Appl. No.: 17/246,226

(22) Filed: Apr. 30, 2021

(65) Prior Publication Data

US 2021/0344760 A1 Nov. 4, 2021

Related U.S. Application Data

(60) Provisional application No. 63/019,288, filed on May 2, 2020.

(51) Int. Cl.
*G06Q 20/40* (2012.01)
*G06F 9/54* (2006.01)
(Continued)

(52) U.S. Cl.
CPC ......... *G06Q 20/4016* (2013.01); *G06F 9/547* (2013.01); *G06Q 10/02* (2013.01);
(Continued)

(58) Field of Classification Search
CPC .... G06Q 20/4016; G06Q 10/02; G06Q 10/10; G06Q 20/3827; G06Q 20/385;
(Continued)

(56) References Cited

U.S. PATENT DOCUMENTS 10,783,500 B1 * 9/2020 Bromwich ............. G06Q 10/00
2016/0316016 A1 10/2016 Arenas et al.
(Continued)

OTHER PUBLICATIONS

X. Hu, N. K. Giang, J. Shen, V. C. M. Leung and X. Li, "Towards Mobility-as-a-Service to Promote Smart Transportation," 2015 IEEE 82nd Vehicular Technology Conference (VTC2015-Fall), Boston, MA, USA, 2015, pp. 1-5, doi: 10.1109/VTCFall.2015.7391182. (Year: 2015).*

(Continued)

*Primary Examiner* — Shannon S Campbell
*Assistant Examiner* — Manal A. Alsamiri
(74) *Attorney, Agent, or Firm* — MUGHAL GAUDRY & FRANKLIN PC

(57) ABSTRACT

An interface system may include a communication interface. The interface system may include one or more processing units communicatively coupled with the communication interface. The interface system may include a memory having instructions stored thereon that, when executed, cause the one or more processing units to provide an application programming interface (API) that enables a managing authority system and a plurality of mobility entity systems to communicate with one another and the interface system via the communications interface. Each of the mobility entity systems may provide at least one mode of transportation. The instructions may further cause the one or more processing units to establish a communications link between the managing authority system and at least one of the plurality of mobility entity systems.

20 Claims, 12 Drawing Sheets

(51) Int. Cl.
   *G06Q 10/02* (2012.01)
   *G06Q 10/10* (2023.01)
   *G06Q 20/38* (2012.01)
   *G06Q 50/40* (2024.01)
   *H04L 43/0811* (2022.01)
   *H04L 43/10* (2022.01)
   *H04L 67/51* (2022.01)

(52) U.S. Cl.
   CPC ......... *G06Q 10/10* (2013.01); *G06Q 20/3827* (2013.01); *G06Q 20/385* (2013.01); *G06Q 20/389* (2013.01); *G06Q 20/40* (2013.01); *G06Q 50/40* (2024.01); *H04L 43/0811* (2013.01); *H04L 43/10* (2013.01); *H04L 67/51* (2022.05)

(58) Field of Classification Search
   CPC ...... G06Q 20/389; G06Q 20/40; G06Q 50/30; G06F 9/547; G06F 16/256; H04L 43/0811; H04L 43/10; H04L 67/51; H04L 41/0806; H04L 41/5054; H04L 43/50
   See application file for complete search history.

(56) References Cited

U.S. PATENT DOCUMENTS

| | | | |
|---|---|---|---|
| 2018/0300693 A1* | 10/2018 | Gopinath | G06Q 20/4016 |
| 2019/0102850 A1* | 4/2019 | Wheeler | G06Q 20/405 |
| 2019/0188121 A1* | 6/2019 | Simon | G06Q 20/0855 |
| 2020/0349569 A1* | 11/2020 | Murao | G06Q 20/407 |
| 2021/0192584 A1* | 6/2021 | Spielman | G06Q 10/047 |
| 2022/0278857 A1* | 9/2022 | Wakabayashi | G06Q 20/127 |

OTHER PUBLICATIONS

International Search Report and Written Opinion mailed Jul. 9, 2021 in International Patent Application No. PCT/US2021/030403, 10 pages.

\* cited by examiner

MOBILITY AS A SERVICE INTERFACE

CROSS-REFERENCE TO RELATED APPLICATIONS

This application claims the benefit of and is a non-provisional of U.S. Provisional Application Ser No. 63/019,288 filed on May 2, 2020, which is hereby expressly incorporated by reference in its entirety for all purposes.

BACKGROUND

Although managing authorities and mobility service providers may work together to provide travelers an assortment of mobility services, there are difficulties in doing so. Technical obstacles arise, for example, when each entity operate their own proprietary services with different computing systems. While these systems are individually usable by travelers using personal computing and/or mobile devices, each individual solution typically has a unique application programming interface (API) that prevents the various systems from being integrated into a single interface. As such, enabling multiple mobile solutions to have interoperability with one another may require months of customized integrations to allow these systems to work together effectively. Therefore, improvements in all-in-one mobile service solutions are desired.

SUMMARY

In one embodiment, an interface system is provided. The interface system may include a communication interface. The interface system may include one or more processing units communicatively coupled with the communication interface. The interface system may include a memory having instructions stored thereon that, when executed, cause the one or more processing units to provide an application programming interface (API) that enables a managing authority system and a plurality of mobility entity systems to communicate with one another and the interface system via the communications interface. Each of the mobility entity systems may provide at least one mode of transportation. The instructions may further cause the one or more processing units to establish a communications link between the managing authority system and at least one of the plurality of mobility entity systems.

In some embodiments, the API may enable the managing authority system and the plurality of mobility entity systems to communicate with one another without the need to program interfaces between each pair of systems. The instructions may further cause the one or more processing units to perform a test procedure for each of the plurality of mobility entity systems to check for a satisfactory connection with the API. A result of the test may enable each of the plurality of mobility entity systems to self-certify with the API. The instructions may further cause the one or more processing units to monitor API performance of each of the plurality of mobility entity systems. The instructions may further cause the one or more processing units to provide a transaction ledger configured to record events associated with one or more selected from the group including planning a journey for a traveler, providing a mobility service for the traveler, and paying for the mobility service. The instructions may further cause the one or more processing units to provide analytics of data in the transaction ledger. The instructions may further cause the one or more processing units to perform a fraud analysis of the transaction ledger. The instructions may further cause the one or more processing units to provide a managing authority the ability to upload one or more contracts. For each of the one or more contracts, the one or more processing units may select a contract type for the respective contract and activate the contract for use in the interface system. The instructions may further cause the one or more processing units to provide a mobility entity the ability to choose a contract of the one or more contracts. The instructions may further cause the one or more processing units to provide the managing authority the ability to approve the mobility entity for the chosen contract.

In another embodiment, a method of operating an interface system is provided. The method may include providing an application programming interface (API) that enables a managing authority system and a plurality of mobility entity systems to communicate with one another and the interface system via a communications interface of the interface system. Each of the mobility entity systems may provide at least one mode of transportation. The method may include establishing a communications link between the managing authority system and at least one of the plurality of mobility entity systems.

In some embodiments, the method may include performing a test procedure for each of the plurality of mobility entity systems to check for a satisfactory connection with the API. A result of the test may enable each of the plurality of mobility entity systems to self-certify with the API. The method may include monitoring API performance of each of the plurality of mobility entity systems. The method may include providing a transaction ledger configured to record events associated with one or more selected from the group including planning a journey for a traveler, providing a mobility service for the traveler, and paying for the mobility service. The method may include providing analytics of data in the transaction ledger. The method may include performing a fraud analysis of the transaction ledger. The method may include providing a managing authority the ability to upload one or more contract. For each of the one or more contracts the method may include selecting a contract type for the respective contract and activating the contract for use in the interface system. The method may include providing a mobility entity the ability to choose a contract of the one or more contracts. The method may include providing the managing authority the ability to approve the mobility entity for the chosen contract.

In one embodiment, a non-transitory computer-readable medium may be provided. The non-transitory computer-readable medium may have instructions stored thereon that, when executed by one or more processors of an interface system, cause the one or more processors to provide an application programming interface (API) that enables a managing authority system and a plurality of mobility entity systems to communicate with one another and the interface system via a communications interface of the interface system. Each of the mobility entity systems may provide at least one mode of transportation. The instructions may further cause the one or more processors to establish a communications link between the managing authority system and at least one of the plurality of mobility entity systems.

In some embodiments, the instructions may further cause the one or more processors to perform a test procedure for each of the plurality of mobility entity systems to check for a satisfactory connection with the API. A result of the test may enable each of the plurality of mobility entity systems to self-certify with the API. The instructions may further cause the one or more processors to monitor API performance of each of the plurality of mobility entity systems. The instructions may further cause the one or more processors to provide a transaction ledger configured to record events associated with one or more selected from the group including planning a journey for a traveler, providing a mobility service for the traveler, and paying for the mobility service. The instructions may further cause the one or more processors to provide analytics of data in the transaction ledger. The instructions may further cause the one or more processors to perform a fraud analysis of the transaction ledger. The instructions may further cause the one or more processors to provide a managing authority the ability to upload one or more contracts. For each of the one or more contracts the instructions may further cause the one or more processors to select a contract type for the respective contract and activate the contract for use in the interface system. The instructions may further cause the one or more processors to provide a mobility entity the ability to choose a contract of the one or more contracts. The instructions may further cause the one or more processors to provide the managing authority the ability to approve the mobility entity for the chosen contract.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION

Figure 1:
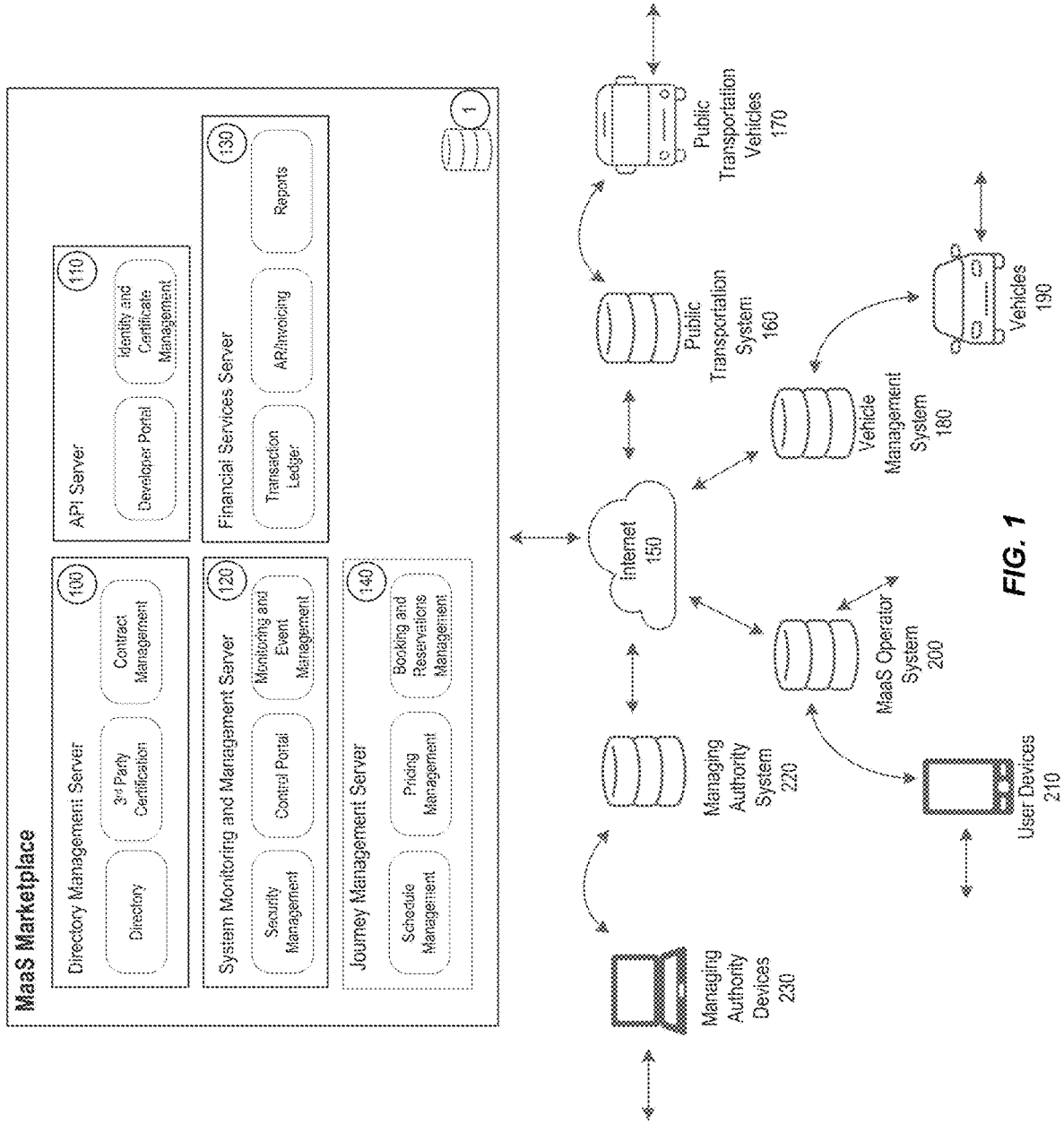
FIG. 1 is a block diagram of a MaaS system capable of providing users with a variety of mobility/transportation services according to an embodiment of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to a method for providing a platform to allow mobility service providers, mobility service aggregators, and/or public transportation providers to collaborate to provide mobility solutions to travelers. That said, a person of ordinary skill in the art will understand that alternative embodiments may vary from the embodiments discussed herein, and alternative applications may exist.

In the world of transportation and mobility, there is an ever-increasing number of entities that provide services. Mobility and transportation services may include traditional forms of public transportation (training, light rail, subway, bus, ferry, etc.) and private transportation (taxi, shuttle, etc.), as well as newer forms of mobility services (bike sharing, scooter sharing, car sharing, e-hailing, etc.). Mobility as a Service (MaaS) may combine these different transport modes to offer a tailored mobility package, offering travelers more options when it comes to travel and payment. A "MaaS operator" (also known as a "MaaS Integrator" or "MaaS Provider") is an organization that combines public and/or private mobility services into a subscription package or pay-as-you-go option and provides the offering to travelers. One or several MaaS operators may operate in a given city/region and may provide services across multiple areas.

Entities that provide mobility services are called Mobility Service Providers (MSPs). MSPs may include all public and/or private organizations, and may offer one or more modes of transportation. MSPs may provide services directly to travelers or via a MaaS operator. A public transit agency or operator may be an example of a public MSP. One example of a private MSP may include a for-profit company providing direct or contracted services for travelers (e.g. using driver-operated vehicles, autonomous vehicles, or traveler self-driven vehicles). Examples of private MSPs may include companies providing rideshare, ridehail, scooter sharing, bike sharing, car rental, etc.

A "managing authority" may include an office, agency, or person responsible for regulation and or control of the mobility services in a given region. In many instances, the managing authority may also be a public MSP. For example, the managing authority may be a city transit agency, department of transportation, and/or regulatory authority.

Although managing authorities, MSPs, and MaaS operators (generically referred to herein as "mobility entities") may work together to provide travelers mobility services, there are difficulties in doing so. Technical obstacles arise, for example, from the MaaS operator and MSP managing and operating their respective services with different systems. Because there is no industry-standard set of Application Programming Interfaces (APIs) that may allow these systems to more easily integrate, it may take months of customized integrations to enable such systems to work together effectively. Business obstacles may also arise, because mobility entities may have different standard contracts and/or business arrangements. Negotiating a commonly agreed-upon relationship may also take quite some time.

Embodiments of the invention(s) provided herein address these and other issues by providing a MaaS interface that allows members (e.g., different mobility entities) to find each other and connect—in both technical and business aspects—in an effective and efficient manner. In particular, the MaaS interface may include specific APIs, portals, and tools that are delivered through a platform (which may be open source and/or proprietary) to facilitate communications between entities to provide mobility services (reservations, journey planning, payment, status, etc.) in an agnostic way.

Embodiments may be considered "agnostic" in two ways. First, the MaaS interface may provide an open integration solution. That is, rather than requiring proprietary integration between the systems of two MaaS interface members (e.g., a MaaS operator and MSP), each member need only connect to the MaaS interface platform one time, which may serve as an intermediary to facilitate communication between the various entities. As an intermediary, not only may the MaaS interface help facilitate communication, but may also maintain a centralized ledger of interactions between the various connected entities. Interface members that connect with the MaaS interface platform may then quickly technically integrate with any other member that has also connected to the MaaS interface platform. For example, the MaaS interface may provide a single software interface that enables connected members to interact seamlessly with one another once connected to the MaaS interface. The MaaS interface may enable members to connect using a standard API. This allows each member to use the API to develop a software connection between their own platform and the MaaS interface, while eliminating the need for the different entities to program connections with APIs for each of the other entities they wish to integrate with. This saves considerable time and effort for the various entities. The MaaS interface API may ensure that each connected entity is able to provide any existing functionality and any necessary data in a desired format that is usable across the MaaS interface platform.

Second, the MaaS interface may enable its members to participate without the need of proprietary backend software. Members may instead interact with the MaaS interface via online portals and APIs, for example. Thus, there does not need to be any additional software outside the MaaS interface platform for mobility services to be effectively provided via the platform. It may be noted that although there may be some distinction between the MaaS interface itself and the platform/system used to provide the MaaS interface, both may be referred to herein interchangeably as the "MaaS interface" or "MaaS interface platform."

Advantages of bypassing proprietary integrations in this manner may be significant. As noted, the number (and type) of MSPs is significantly increasing. Even so, MaaS operators are often reluctant to expand the range and/or type of their services due to the difficulties and costs associated with integrating its existing system with that of an MSP. Traditionally, this process may take months, for example. However, by providing a MaaS interface with which members may quickly integrate, the embodiments provided herein may enable managing authorities the ability to expand the range of their services with relative ease. This may ultimately allow managing authorities to provide more services to their customers, mobility entities to more easily expand into new markets, and customers having more mobility options, thereby simplifying global integration for the various entities and making such integration more feasible without significantly increasing the time or resources needed by each entity. Additionally, any number of mobility service providers and/or other entities may provide journey planning services via the interface, which may enable the mobility service providers to facilitate multi-modal journeys, as the various provider systems may already be linked within the interface. This may help enable seamless journey planning and execution for end users, even when multi-modal journeys are taken.

FIG. 1 is a block diagram of a MaaS system capable of providing users with a variety of mobility/transportation services, according to an embodiment. As with other figures provided herein, FIG. 1 is provided as a non-limiting example. Alternative embodiments may include additional and/or different types of mobility entities (managing authorities, MSPs, MaaS operators). Moreover, it will be understood that there may be any number of vehicles (e.g., public transportation vehicles 170, vehicles 190) or devices (user devices 210, managing authority devices 230) within the MaaS system. Further, the various "systems" shown (including the MaaS interface 1) may include any number of servers and databases utilized to provide the functionality of the corresponding system. Additionally, the various systems and devices shown may include or be integrated into a computing device, such as the computing device 1100 shown in FIG. 11. Additionally, the arrows in FIG. 1 show communication links between the various components. Depending on implementation, there may be any number of intervening devices, networks, etc. used to provide these communication links.

As noted, the MaaS interface 1 may provide a platform in which members may quickly integrate and communicate with each other. As noted, these members may include any number or type of mobility entity. In the example provided in FIG. 1, a public MSP may operate the public transportation system 160 (with corresponding public transportation vehicles 170), a private MSP may operate a vehicle management system 180 (with corresponding vehicles 190, such as cars, shuttles, buses, cabs, etc.). A MaaS operator may operate the MaaS operator system 200, which may allow travelers to use user devices 210 for journey planning and ticketing for travel provided by MSPs connected to the MaaS interface 1. In some embodiments, for example, the MaaS operator system 200 may be used to support a software application, or "app," executed on user devices 210. Additionally or alternatively, the MaaS operator system 200 may offer a web portal, allowing users to access to MaaS services via user devices 210 accessing the web portal.

Components maintained by managing authority may include a managing authority system 220 and/or managing authority devices 230. As noted, the managing authority may include a public transit system or operator. And thus, in some embodiments, the public transportation system 160 may be integrated with the managing authority system 220.

As shown, the MaaS interface 1 itself may include a variety of components and may be managed by an interface provider (not shown). Although shown in FIG. 1 as individual servers 100-140, the functionality provided by the MaaS interface 1 may be separated into different logical components and/or arranged in a different way. It may be further noted that these components may be executed by one or more computer systems (e.g. computer system 1100 illustrated in FIG. 11), which may be located at a single location or geographically dispersed (e.g., executed "in the cloud").

The directory management server 100 may include a collection of software applications and modules configured to manage the membership of all members of the interface. This may include, for example, a directory that lists the various members, allowing members to discover and communicate with each other. Each entry in the directory may include the name of the member, the service(s) provided by the member, and performance. Performance for a particular member may include objective analytics regarding timeliness of mobility services, API performance, etc. This may enable another member to weigh these types of data when determining whether or not to enter into a relationship with the particular member.

The directory management server 100 may also perform third-party certification. According to some embodiments, the MaaS interface 1 may perform certification of members prior to allowing members to participate in the interface. The third-party certification may be performed by the directory management server 100, and may include various workflows that help ensure a member's integration into the MaaS interface 100 has been done properly, and the workflows of getting a member accepted into the system once integration is complete. Once certified, member may get promoted into the directory.

Additionally, the membership identity server 100 may perform contract management for the MaaS interface 1. Contract management may include obtaining and/or storing contracts to establish various business relationships. These contracts may enumerate the terms and conditions to establish a business relationship between members. As discussed in more detail below, members may be able to upload and use their own contracts. However, the MaaS interface 1 may additionally provide its own contracts for use by its members. In some embodiments, contract management may contain separate terms and conditions that prospective members need to agree to in order to participate in the MaaS interface 1 (e.g., a contract between a member and the MaaS interface provider).

The API server 110 may include a technical layer with which members may interact with the MaaS interface 1. Here, the API server may provide a developer portal (e.g., a web portal) that allows developers to login and access specification information for any number of APIs provided by the MaaS interface 1 that enable various functionality within the MaaS interface 1. For example, the APIs may enable journey planning, transaction management, contract management, data transfer, and/or other functionality within the MaaS interface 1. The API server 110 may further provide the APIs and further allow developers to test against the APIs as developers develop their own interfaces to interact with the APIs of the MaaS interface 1. For example, during a test an entity may be prompted to supply a particular data entry information in a particular format via the API. The test may return an indicator of whether the information provided was correct, which may enable the entity to self-certify that the entity system has successfully integrated the API specifications.

The API server 110 may further provide identity and certificate management, which may be used to securely authenticate a service into the MaaS interface 1. This may include, for example, maintaining and/or accessing member accounts for authentication.

The financial services server 130 may facilitate transactions between members of the MaaS interface 1. The financial services server 130 may provide a transaction ledger, for example, that creates and stores a record of transactions that flow through the MaaS interface 1. This may facilitate financial reconciliation and invoicing between members. It may also facilitate performance tracking of individual members.

As an example of information recorded by the transaction ledger with regard to an individual traveler's trip is as follows. The traveler may first pull up a travel application (on a user device 210) provided by a MaaS operator. Using the application, the traveler may select a trip using a particle mode of transportation (such as a scooter), provided by an MSP that provides scooter sharing. When the user selects the trip in the application, a ledger entry may be recorded showing the traveler's selection of the trip. The MSP may then respond by providing an estimated price, which may result in another ledger entry with the estimated price. If the traveler then chooses to book the trip, this confirmation may be reported as another transaction ledger. Additional entries may be made that record various events associated with the trip, including entries for unlocking the scooter, the scooter arriving at the trip's destination, locking the scooter at the destination, etc. The MaaS operator may further handle the payment by the traveler, which again may be recorded in the transaction ledger. Given this information in the ledger, the MSP that provided the scooter service may determine that the MaaS operator owes the MSP money for the trip taken and paid for by the traveler.

The financial services server 130 may further provide accounts receivable (AR)/invoicing and reports to various members. In the example above, for example, the MSP that provided the scooter service may interface with the financial services server 130 retrieve invoicing information, which may show the money owed to the MSP by the MaaS operator. The terms and conditions related to invoicing may be determined between the MSP and MaaS operator, and thus one or both members may interact with the financial services server 130 to obtain invoicing information and invoice/pay the other accordingly to reconcile the various payments. The financial services server 130 may further provide reports, enabling members to see transaction history and other financial and non-financial performance data. In some embodiments, the MaaS interface 1 may provide its members with various analytics of transactions based on data in the transaction ledger.

The journey management server 140 provides members an interface with the MaaS interface 1 to enable the planning and booking of travel. For example, the journey management server 140 may provide schedule management, with which MSPs may provide schedules for services. Such schedules may include predefined schedules (e.g., bus or train schedules), an Estimated Time of Arrival (ETA) for on-demand services (e.g., e-hailing/ridesharing or shuttle), estimated transit times for various modes of transit (including user-controlled options, such as walking, cycling, scootering, and/or other user-controlled modes of transport). As such, MSPs may upload predefined schedules to the journey management server 140 and/or interact with the journey management server 140 in real-time to enable the system 200, and subsequently user devices 210, to access real-time schedule information using the MaaS interface 1. The pricing management functionality of the journey management server 140 may enable the MaaS interface 1 to receive requests for providing pricing for a journey. This may include price estimation prior to booking the journey, as well as processing the payment for the journey once the journey is complete. Finally, the journey management server 140 may also allow for booking and reservations management for a journey.

As an example of how the journey management server 140 may be utilized during the booking of a journey, a traveler who may want to use a rideshare service for a journey logs onto a software application using the user device 210. The software application may act as a software client, which interacts with a server executed by the system 200. The system 200 may then access the journey management server 140 and use the schedule management functionality to determine an ETA for one or more rideshare vehicles 190 of an MSP providing a rideshare service. The journey management server 140 may send an inquiry to the vehicle management system 180 of the MSP to receive the ETA(s) in real time, in response to receiving a schedule management request from the system 200. Additionally, the MSP may provide an estimated price for the journey (along with the ETA(s)), which may also be provided by the vehicle management system 180 (or an associated system of the MSP (not shown in FIG. 1)). If the traveler chooses to book a journey using a vehicle 190 of the MSP via the software application on the user device 210, the user device may then send information indicative of the booking to the system 200 which may relay a request to book the trip using the bookings and reservations management functionality of the journey management server 140. The journey management server 140 may relay this information to the MSP to reserve the vehicle 190 and book the journey. The bookings and reservations management functionality of the journey management server 140 may also manage changes to the journey that may happen along the way (cancellation, changes in route, etc.), which may be initiated by the traveler using the user device 210 and/or MSP via the vehicle management system 180.

According to some embodiments, the functionality of the journey management server 140 may vary from this example. For example, in some instances and/or embodiments, the journey management server 140 may request ETAs and price estimations from multiple MSPs, which may provide mobility services of the same or different type. A traveler may be able to select this functionality using a user device 210 by, for example, selecting a user option to request journey estimates from multiple mobility service providers. This selection may be relayed to the journey management server 140, which may then send requests to multiple MSPs accordingly. The journey management server 140 may access any number of MSP systems when accessing journey planning services for a given journey. Additionally, in some embodiments, the journey itself may be a multi-modal journey that includes bookings with multiple MSP systems and/or multiple bookings with a single MSP system (such as two different shared rides for different legs of the journey).

Returning back to the MaaS interface 1, the system monitoring and management server 120 may provide the tools used by the MaaS interface provider to manage the MaaS interface 1. This may include, for example, security management tools, monitoring and event management, and a control portal. The control portal may a portal (e.g., web portal) through which the MaaS interface provider may access the various tools provided by the system monitoring and management server 120. Monitoring and event management tools may provide Information Technology (IT)—level management of a API services and other services provided by the MaaS interface 1, to help ensure the services are running properly. Security management may include audit and monitoring tools, for example, to be able to review the transaction ledger (and/or other data sources) for fraud, disable a member of the MaaS interface 1 if inappropriate activity is detected, and so forth. For example, if usage of the MaaS interface 1 is uncharacteristically high the member may be rate-limited or disabled until an audit is performed.

Figure 2:
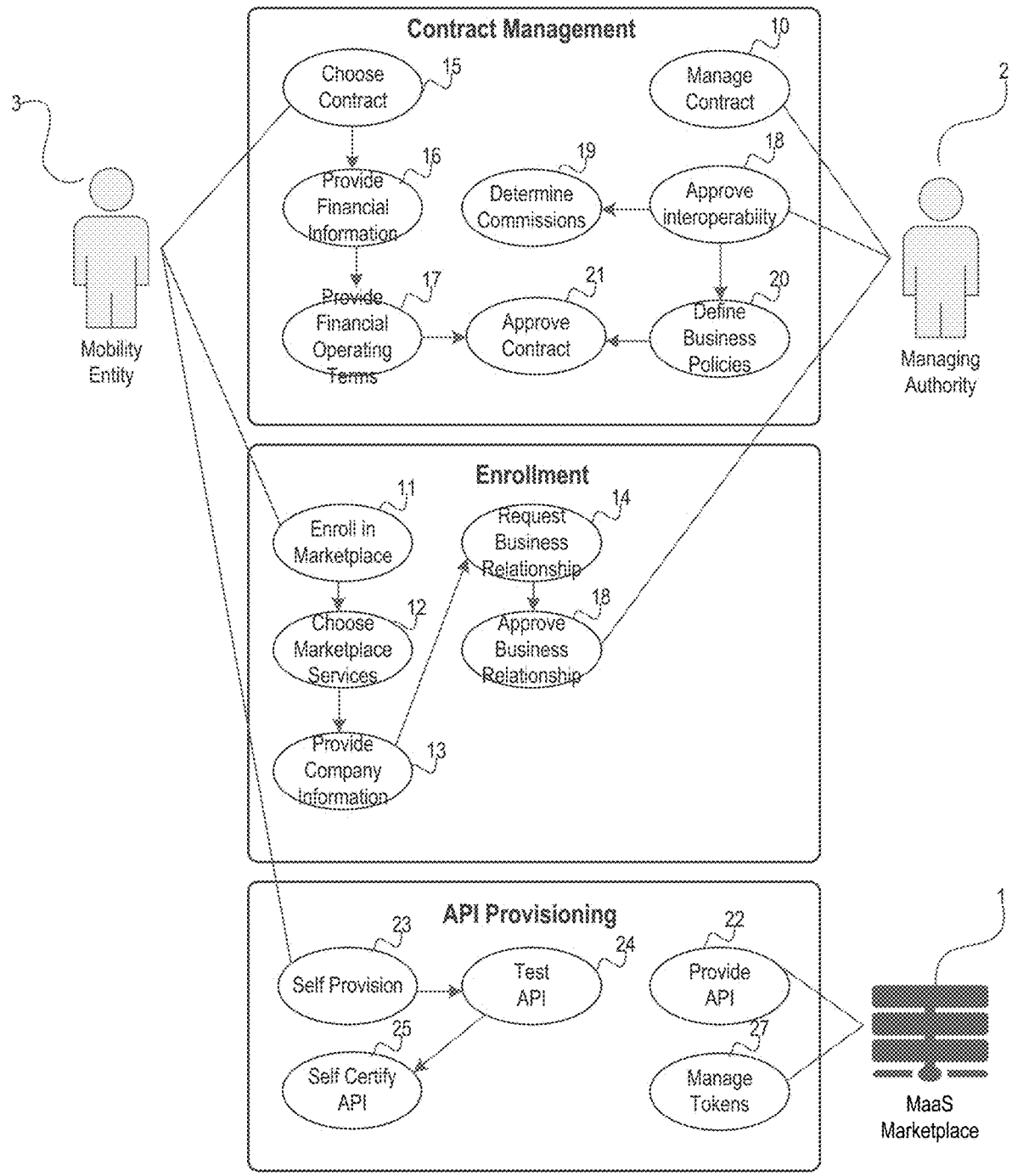
FIG. 2 is a diagram of contract management, enrollment, and API provisioning functionalities of the MaaS interface according to embodiments.

FIG. 2 is a diagram showing how contract management, enrollment, and API provisioning functionalities of the MaaS interface 1 may be used by the managing authority 2, mobility entity 3, and MaaS interface 1 itself to provide onboarding of the mobility entity 3 (e.g. an MSP) into the MaaS interface 1. Flow diagrams associated with FIG. 2 are provided in subsequent figures. As with other figures, FIG. 2 is provided as a non-limiting example. Alternative techniques for onboarding mobility entities 3 may be used in alternative embodiments.

Operations shown in the contract management, enrollment, and API provisioning blocks in the middle of the diagram are labeled in rough order of operation. For instance, the onboarding process may begin at the manage contracts 10 operation, in which the managing authority 2 upload/provides contracts via the MaaS interface 1 available to the mobility entity 3 to view and except to join the MaaS interface 1 and connect with other mobility entities. For its part, the mobility entity 3 may perform the operations of enrolling in the interface 11, choosing interface services 12 (e.g., which services it intends to provide within the interface), provide company information 13, and request a business relationship 14, which may be approved 18 by the managing authority 2. The mobility entity 3 may choose a contract 15 (which may be provided by the managing authority 2) provide financial information 16, and provide operating terms 17. Operating terms may include financial terms, data security requirements, permitted operating locations (geo-fencing), permitted modes of travel, trip performance requirements, etc. In response, the managing authority 2 may approve interoperability 18 of the mobility entity 3, determine commissions 19, define business policies 20. Both managing authority 2 and mobility entity 3 may then approve the contract 21.

The mobility entity 3 may also become certified to operate within the MaaS interface 1 by setting up its systems to work with the APIs provided by the MaaS interface 1 (e.g. via API server 110 in FIG. 1). As noted, the MaaS interface 1 may provide the API 22. The mobility entity 3 may self-provision 23 and test against the API 24. Once testing is satisfactory, the mobility entity may self-certify 25. The MaaS interface 1 may grant tokens to approved mobility entities and manage the tokens 27 granted to entities approved for operating within the MaaS interface 1. These tokens may authorize usage of the API to the approved entities.

Figure 3:
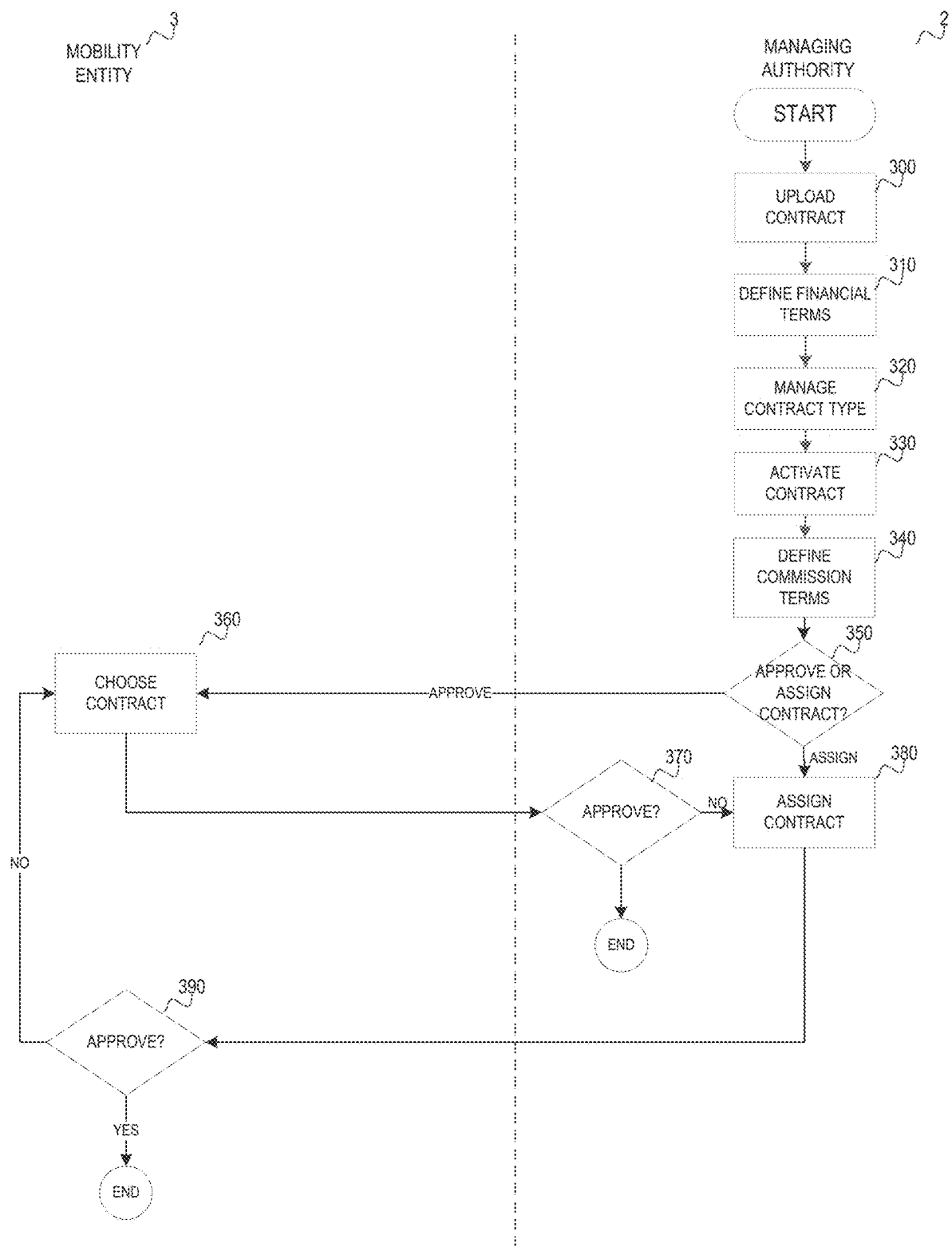
FIG. 3 depicts a flow diagram of one embodiment of the contract management aspect of the enrollment process.

FIG. 3 provides a flow diagram, illustrating one embodiment of the contract management aspect of the enrollment process illustrated in FIG. 2 in more detail. In alternative embodiments, different function shown may be performed in a different order. Each of the operations shown in the blocks of FIG. 3 may be enabled by the MaaS interface 1.

The managing authority 2 may have various types of generic contracts to employ within the MaaS interface 1. Different types of contracts may be used to define different types of relationships, business agreements, financial and/or terms, etc. The process illustrated in FIG. 2 may start by the managing authority 2 uploading a contract, as shown by block 300. Each contract may have associated financial and/or other terms and be of a particular contract type. Accordingly, the managing authority 2 may further define the various terms associated with contract, as shown in block

310. Such terms may include, for example, apportionment, frequency (e.g., monthly, quarterly, with each transaction), etc. The managing authority 2 may indicate the type of contract uploaded, as shown in block 320. Contract types may include, for example, contracts associated with different MSPs, such as an MSP operating as a demand responsive transport, operating only as a ridehail, operating as a vanpool, etc. According to some embodiments, the managing authority 2 may define which type of subcontracts there are, and upload one or more contracts for each type. Contracts may further be activated (shown in block 330) by the managing authority 2 for use within the MaaS interface 1, at which point the contracts are available for review by mobility entities 3.

As shown at block 340, the managing authority 2 may further define the commission terms for a contract. The managing authority 2, for example, may incentivize mobility entities 3 to operate at a particular location, to provide a particular service, etc. To do so, the managing authority 2 may offer commissions associated with these services as an incentive.

At block 350, managing authority may either approve or assign a contract for use with a particular mobility entity 3. With regard to assignment, the MaaS interface 1 may allow the managing authority 2 to assign a contract (shown at block 380) to a particular mobility entity 3. The mobility entity 3 may have the option of whether to approve the contract, as shown in block 390. According to some embodiments, for example, the mobility entity 3 may receive a notification that the managing authority 2 has assigned a contract to the mobility entity 3 to approve. If the mobility entity 3 approves, the process of establishing a contract between the parties may end. Otherwise, the mobility entity 3 may choose its own contract (shown at block 360) and send the contract to the managing authority 2 to approve (at block 370). If the managing authority 2 does not approve, the managing authority 2 may assign a different contract (at block 380), and the negotiation process may continue. Otherwise, if the managing authority 2 does approve, the process may end.

Figure 4:
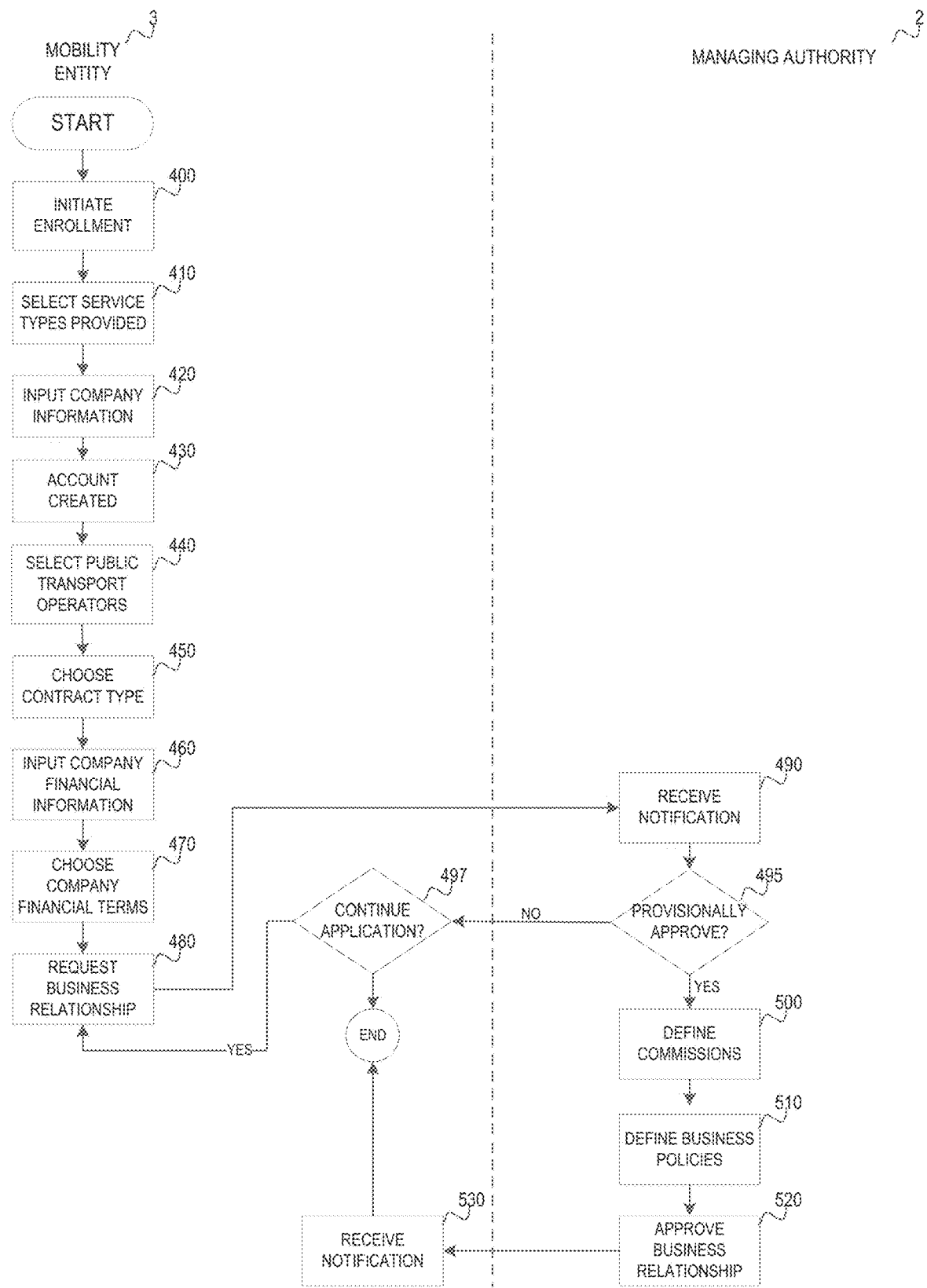
FIG. 4 depicts a flow diagram of one embodiment of the contract management aspect of the enrollment process.

FIG. 4 provides a flow diagram, illustrating one embodiment of the enrollment aspect of the enrollment process illustrated in FIG. 2 in more detail. Again, in alternative embodiments, different function shown may be performed in a different order. Also, each of the operations shown in the blocks of FIG. 4 may be enabled by the MaaS interface 1.

The process may begin at block 400, in which the mobility entity 3 initiates enrollment by logging onto the MaaS interface 1 to begin the enrollment process. During the enrollment process, the mobility entity 3 may further select the service types it intends to provide (shown at block 410) within the interface (e.g., mode(s) of transportation). According to some embodiments, the MaaS interface may have a predefined list of services from which the mobility entity 3 may select the service(s) it intends to provide. The company information provided by the mobility entity 3 provided at block 420 may include a name, a location, and/or other basic entity-related information. At that point, the account may be created within the MaaS interface 1 (as shown at block 430).

Continuing on, the mobility entity 3 may then select the public transport operators with which it would like to operate (shown in block 440). Depending on the operator selected, different contract types may then be available to the mobility entity 3. The mobility entity 3 may then choose the contract type (shown above 450), financial information (block 460), and/or financial terms (block 470). The mobility entity 3 may then request the business relationship with the respective operator (block 480). The mobility entity may repeat steps 440-484 for each transport operator with which the mobility entity 3 would like to do business.

In response, the MaaS interface 1 may provide the managing authority 2 with a notification of the request, as shown in block 490. At block 495, the managing authority 2 may then provisionally approve the business relationship request, or not. It could be, for example, that the managing authority 2 would like additional information from the mobility entity 3 before accepting the business relationship. If so, the process may proceed to block 497, at which point the mobility entity 3 may choose whether to continue the application (e.g., by providing additional information and/or refining the application in other ways) or terminate the process. Managing authority 2 may prompt mobility entity 3 for the additional information in some embodiments.

If the managing authority 2 decides to provisionally approve the request for a business relationship, the process may proceed to block 500, at which the managing authority may define commissions, define business policies (at block 510), and/or approve the business relationship (at block 520). If this is case, the MaaS interface 1 may provide the mobility entity 3 with a notification that the business relationship has been approved, which may be received at block 530 and which may complete this aspect of the onboarding process of the mobility entity 3.

Figure 5:
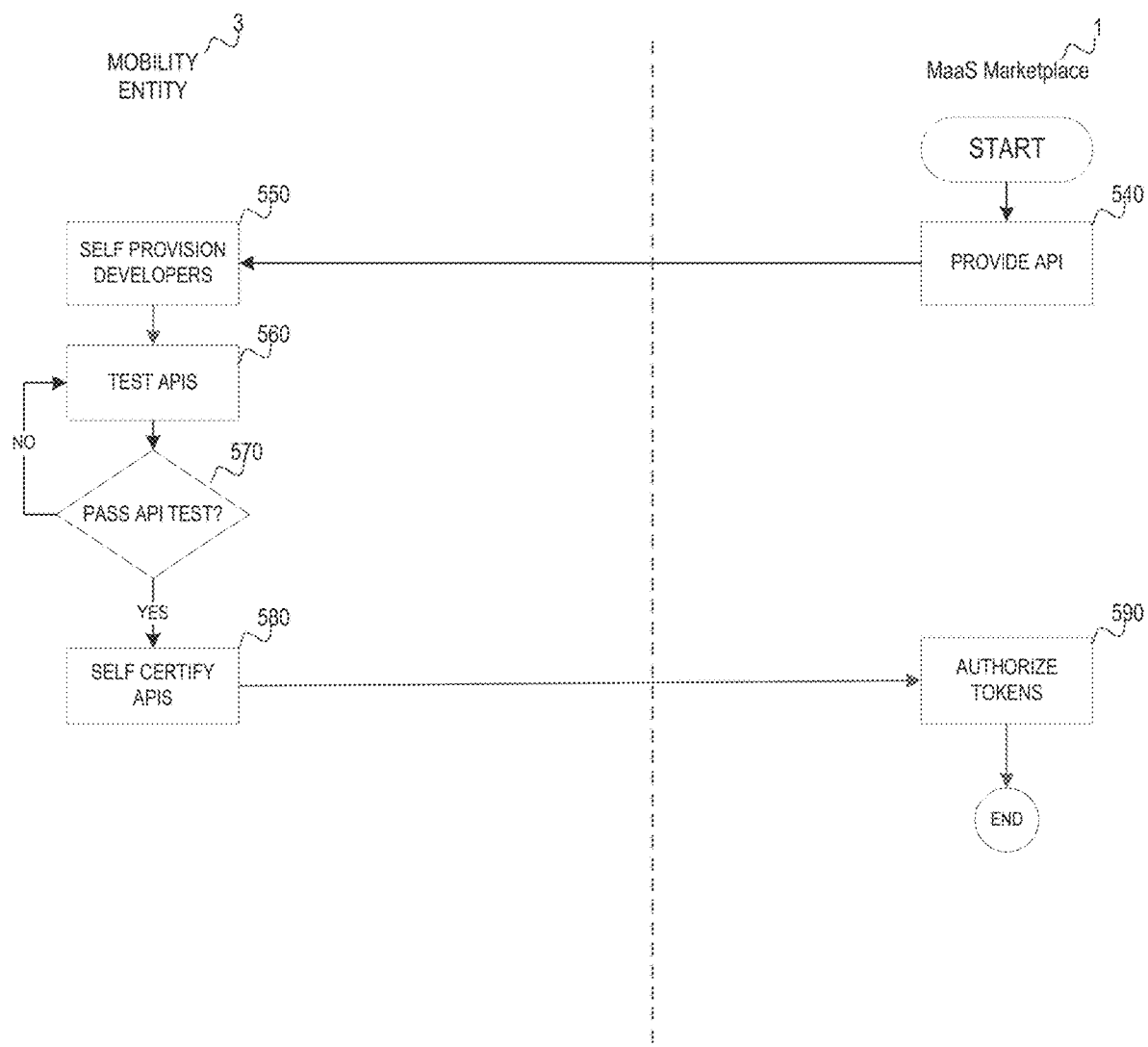
FIG. 5 depicts a flow diagram, illustrating the API provisioning aspect of the enrollment process according to embodiments.

FIG. 5 provides a flow diagram, illustrating the API provisioning aspect of the enrollment process illustrated in FIG. 2 in more detail. Again, in alternative embodiments, different function shown may be performed in a different order. Also, each of the operations shown in the blocks of FIG. 5 may be enabled by the MaaS interface 1.

Here, the MaaS interface 1 may start the process by providing the API at block 540. As previously indicated with regard to FIG. 1, providing an API may be performed by the API server 110 of the MaaS interface 1. With the API provided, developers for the mobility entity 3 may perform the operations shown at block 550-580 to develop an interface with the API that performs at a satisfactory level. For example, developers may test against the API provided by the MaaS interface 1 during development to determine whether the mobility entity 3 has a properly functioning connection with the API of the MaaS interface 1. Once the mobility entity 3 determines that it interfaces with the API at a satisfactory level, the mobility entity may self-certify (as shown at block 580), at which point the MaaS interface 1 may authenticate the mobility entity 3 and authorize the mobility entity's use of the MaaS interface 1. In alternative embodiments, the MaaS interface 1 may provide specific requirements for a mobility entity 3 to meet prior to using the MaaS interface 1. Once the requirements are met, tokens will be provisioned to authorize usage of the API to the approved entities at block 590.

Figure 6:
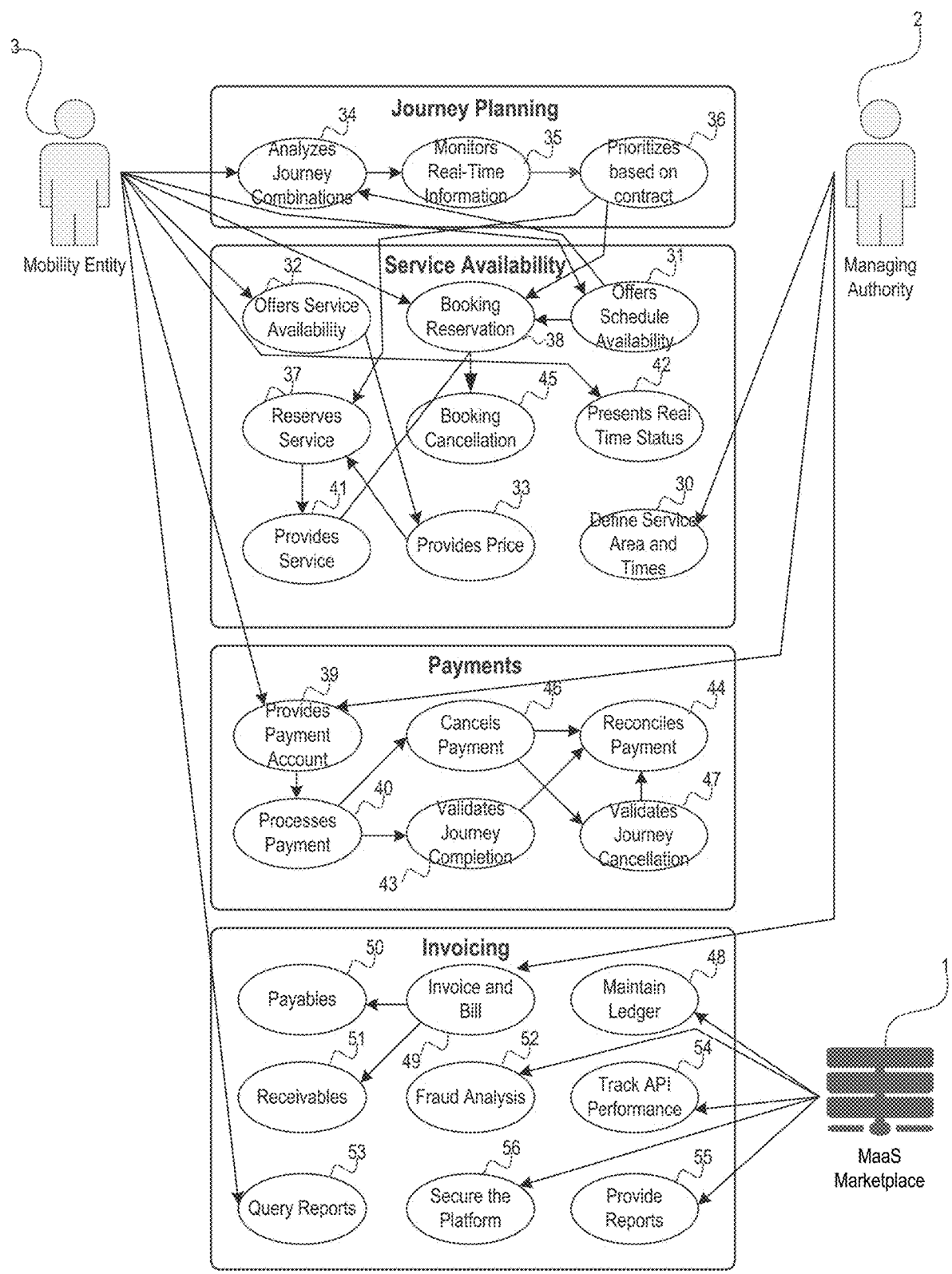
FIG. 6 depicts a journey planning, service availability, payments system, and invoicing system of the MaaS interface.

FIG. 6 is a diagram similar to FIG. 2, showing how journey planning, service availability, payments, and invoicing of the MaaS interface 1 may be used by the managing authority 2, mobility entity 3, and MaaS interface 1 itself to provide Business to Business (B2B) journey planning within the MaaS interface 1. Flow diagrams associated with FIG. 6 are provided in subsequent figures. As with other figures, FIG. 6 is provided as a nonlimiting example. Alternative techniques for journey planning may be used in alternative embodiments.

The process may begin with a managing authority defining service area and service times 30, indicating where and when mobility entities 3 may provide services (such as when and where a traveler may utilize various modes of transport offered by the mobility entities 3). With service area and times defined, the mobility entity 3 may offer schedule availability 31 and service availability 32. For example, mobility entity 3 may indicate via the MaaS interface 1 the schedule of services in the defined area (e.g., by providing via the journey management server 140).

When queried, about a service the mobility entity 3 may further provide a price 33 for the service. To do this, the mobility entity 3 may analyze various journey combinations 34 to determine whether it may provide a mobility service to a traveler for and how it journey could be executed. This analysis may be informed by monitoring real-time information 35 of vehicles (e.g., vehicles 190), schedules, etc. of the mobility entity 3. Based on that information, and in view of any terms in the mobility entity's contract for providing mobility services for the journey (e.g., area/schedule restrictions) the mobility entity 3 may then provide one or more proposed journey plans, which may be prioritized based on the contract 36. A traveler (not shown) decides to book a service of the mobility entity 3, the mobility entity 3 may then reserve the service 37 and create a corresponding reservation 38 if needed.

With regard to payment for the journey, either the mobility entity 3 or the managing authority 2 may provide the payment account 39 to pay for the journey, then process the payment 40. The MaaS interface 1 may provide one or more corresponding entries in the transaction ledger of the financial services server. The details of processing payment may vary, depending on desired functionality.

The mobility entity 3 provides the service 41 and may present real-time status information 42, and/or validate journey completion 43 once the journey is complete. Again, an entry may be made regarding the completion of the journey within the transaction ledger of the MaaS interface 1 and information from the ledger may further be used to reconcile payment 44 between the mobility entity 3 and managing authority 2. Typically, the ledger may serve as a centralized database of the interactions between the various members of the MaaS interface 1 and/or journeys and/or journey planning interactions with end users. The ledger may not store any personal identifying information and/or payment information of end users. Any potentially identifying information may be hashed and/or otherwise tokenized to protect the personal and/or payment information. Tokens may be used that enable members to reconcile any necessary payments without exchanging sensitive information.

In the case of a cancellation of the booking before or during the journey, the mobility entity 3 may report the booking cancellation 45. If this occurs, the payment may be canceled 46 and, once the journey cancellation is validated 47, parties again may reconcile payment 44.

With regard to invoicing, the MaaS interface 1 may, as indicated, maintain the ledger 48 that may contain various entries for the journey. This may be used by the managing authority 2 (or another party, depending on contractual terms) to invoice and bill 49 for payables 50 and/or receivables 51. As noted with regard to FIG. 1, the MaaS interface 1 may further provide fraud analysis 52 and reports 55, allowing the mobility entity 3 to query reports 53. These reports may include API, service, and financial performance, usage, and transaction statistics by mode. The MaaS interface may further track API performance 54 and secure the platform 56.

Figure 7:
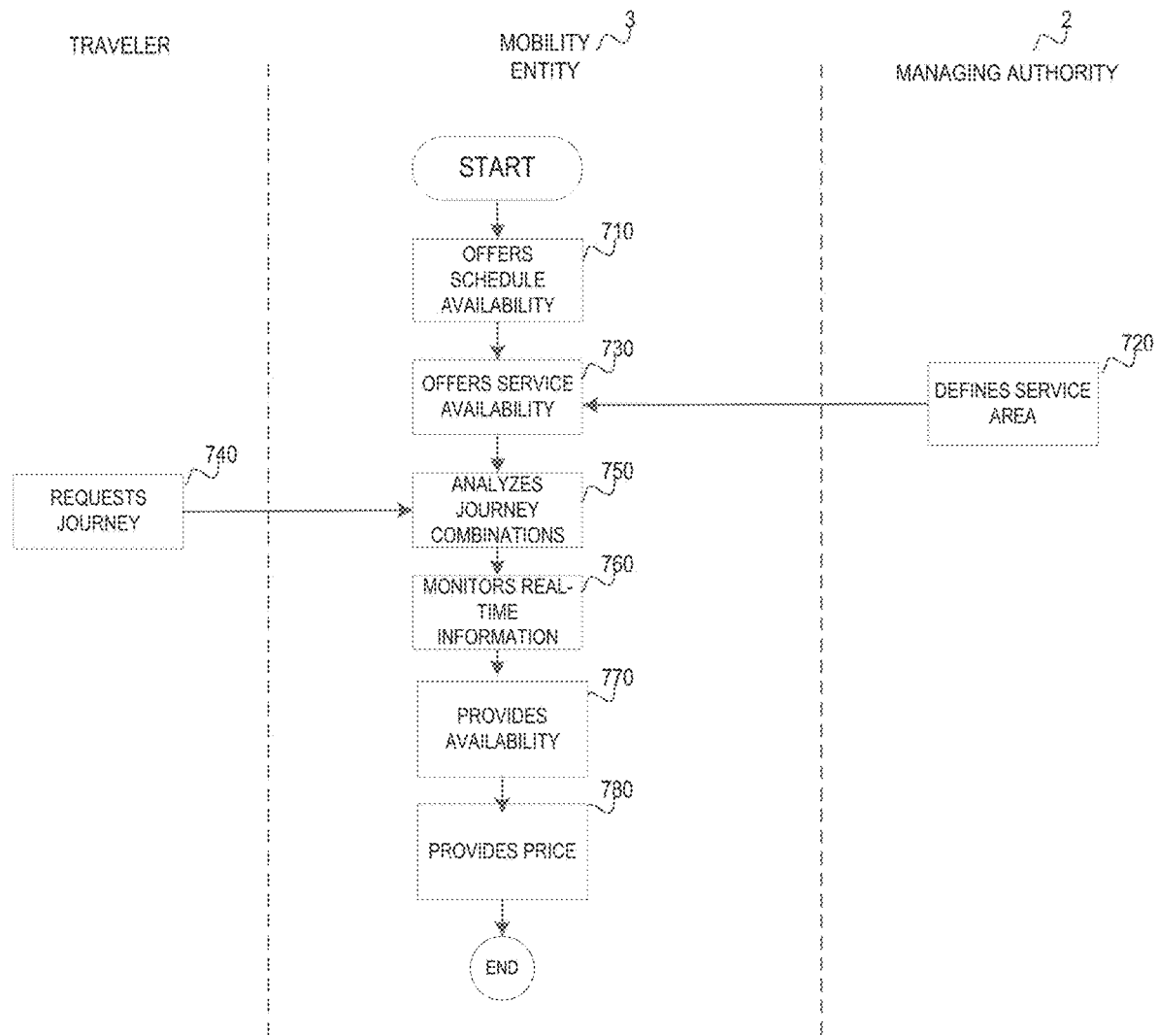
FIG. 7 depicts a flow diagram illustrating one embodiment of the scheduling aspect of the functionality of the MaaS interface.

FIG. 7 provides a flow diagram, illustrating one embodiment of the scheduling aspect of the functionality of the MaaS interface discussed with regard to FIG. 6 in more detail. In alternative embodiments, different function shown may be performed in a different order. Also, each of the operations shown in the blocks of FIG. 7 may be enabled by the MaaS interface 1.

As shown at block 710 and described with regard to FIG. 6, the mobility entity 3 may offer schedule availability via the MaaS interface 1. The managing authority 2 may define a service area (block 720) for a service provided by the mobility entity 3, and the mobility entity 3 may respond by offering its service availability (block 730) in the defined service area. In response to a journey request (block 740) from a traveler, the mobility entity may analyze various journey combinations (block 750) for providing mobility services for the requested journey and further monitor real-time information (block 760) to determine options. The mobility entity 3 may then provide the availability (block 770) of one or more determined services along with an associated price (block 780). The subsequent flow for the journey itself is shown in FIG. 8.

Figure 8:
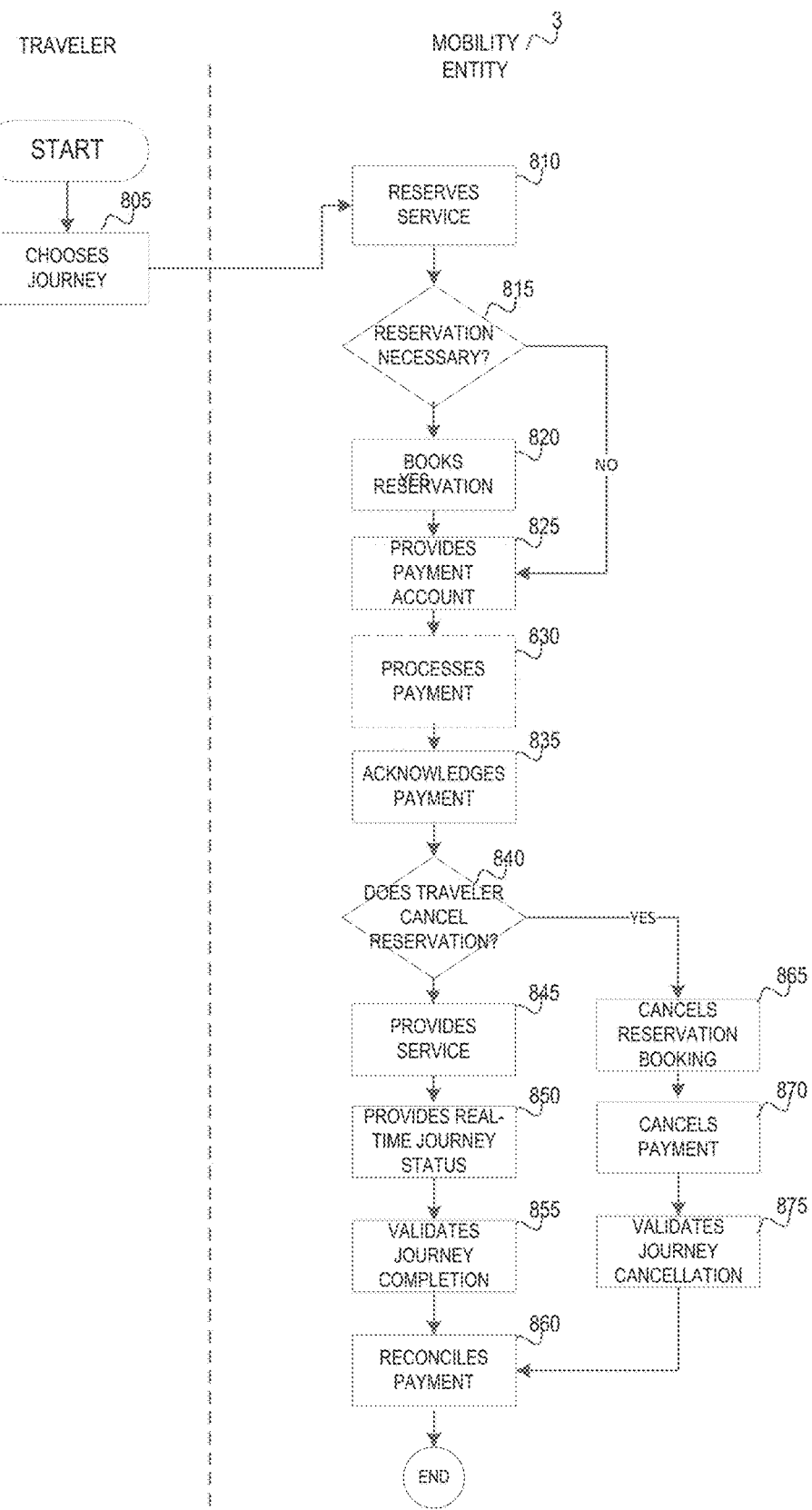
FIG. 8 depicts a flow diagram illustrating the journey planning aspect of the functionality of the MaaS interface.

FIG. 8 provides a flow diagram, illustrating the journey planning aspect of the functionality of the MaaS interface discussed with regard to FIG. 6 in more detail. In alternative embodiments, different function shown may be performed in a different order. Also, each of the operations shown in the blocks of FIG. 8 may be enabled by the MaaS interface 1.

Here, the process may begin by the traveler choosing a journey, as shown at block 805, by, for example, selecting the journey using a software application executed at a user device 210. The mobility entity 3, upon receiving notification of the travelers selection of the journey via the MaaS interface 1, may then begin a service reservation process, as shown at block 810. At block 815, the mobility entity 3 first determines whether a reservation is necessary. If so, the mobility entity 3 may book the reservation (block 820) and may proceed to provide a payment account (block 825). If a reservation is not necessary, the mobility entity 3 may simply provide the payment account (block 825). In either case, the mobility entity 3 may then process the payment 830. As previously noted, payment processing will vary, depending on a type of account and/or service, a business relationship between the mobility entity 3 and managing authority 2, and so forth. Thus, payment processing may involve different corresponding processes and/or entities. When the payment is processed, the mobility entity 3 may then acknowledge payment (block 835).

Before or during the travelers journey, the mobility entity 3 may determine whether the traveler cancel reservation (at block 840). If not, the mobility entity 3 may provide (or continue to provide) the service (block 845), and may further provide real-time journey status 850 via the MaaS interface 1 (enabling, for example, the managing authority, MaaS operator, and/or traveler to determine the travelers location during the journey). Once the journey is complete, the mobility entity may validate journey completion (block 855) and reconcile payment (block 860). Alternatively, if the traveler cancels the reservation (or if the reservation needs to be canceled for any reason), the mobility entity may cancel the reservation booking (block 865), cancel payment (block 870), and validate journey cancellation (at block 875) before reconciling payment (block 860).

Figure 9:
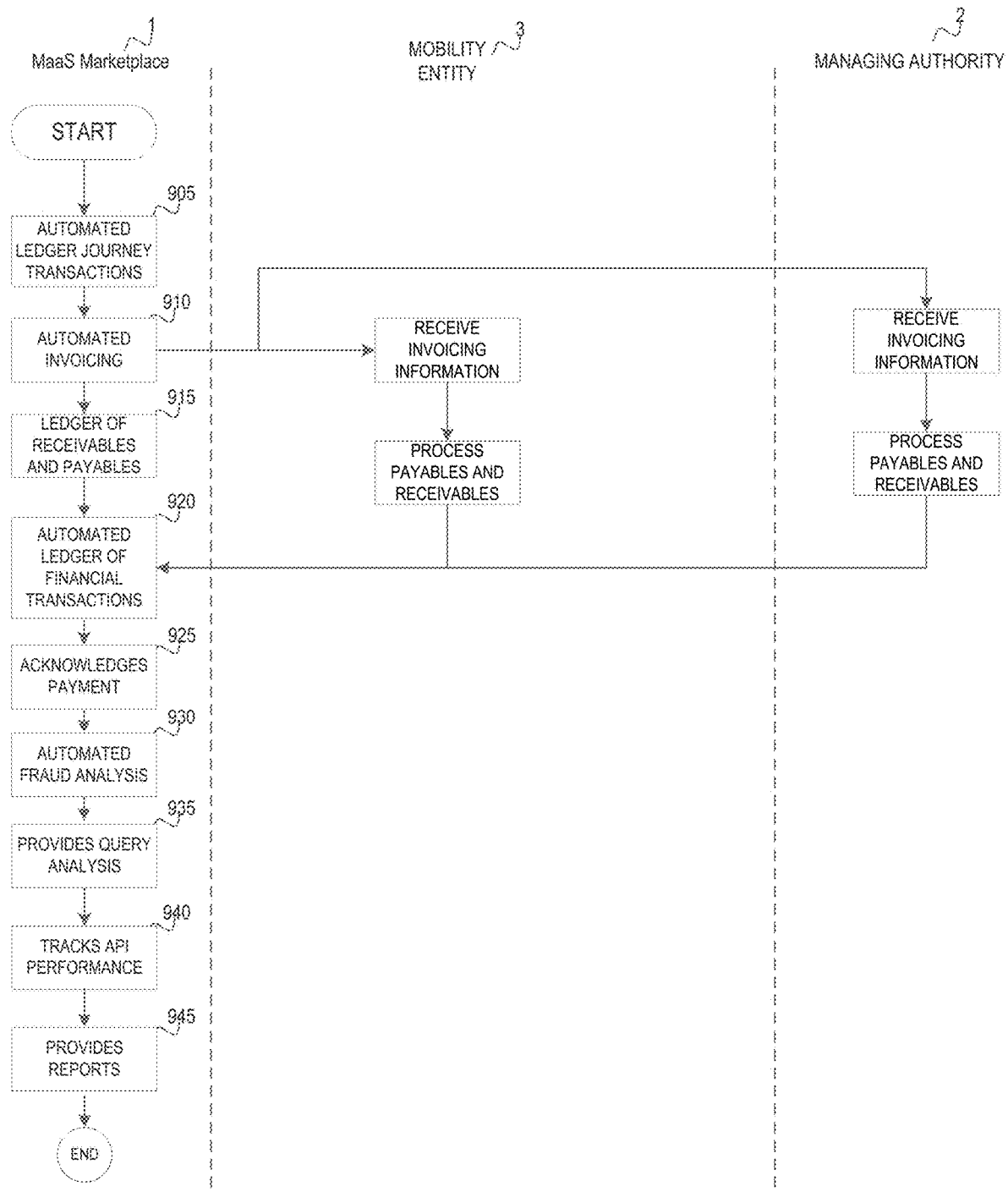
FIG. 9 depicts a flow diagram illustrating one embodiment of the invoicing aspect of the functionality of the MaaS interface.

FIG. 9 provides a flow diagram, illustrating one embodiment of the invoicing aspect of the functionality of the MaaS interface discussed with regard to FIG. 6 in more detail. In alternative embodiments, different function shown may be performed in a different order. Also, each of the operations shown in the blocks of FIG. 9 may be enabled by the MaaS interface 1.

Here, the process may start with the functionality illustrated in block 905, where the MaaS interface 1 takes an automated ledger of the journey transactions. As previously noted, the ledger may be used to record any of a variety of journey-related events, including booking a reservation, canceling a reservation, providing payment, canceling a payment, validation of journey completion, and so forth. At least a subset of these entries in the ledger may be used to provide automated invoices, as shown in block 910. These invoices may be sent to the mobility entity 3 and/or managing authority 2, which may each receive the invoicing information and process the payables and receivables, as shown. The ledger may also include a ledger of receivables and payables, as indicated in block 915. Once the payables and receivables have been processed by the mobility entity 3 and/or managing authority 2, this too may be entered into the ledger, providing an automated ledger of financial transactions (shown at block 920). The MaaS interface 1 may then acknowledge payment (block 925). For example, the MaaS interface 1 may communicate a message to one or both parties of the transaction that the transaction has been successful.

According to some embodiments, the MaaS interface 1 may perform various post-transaction operations, as indicated in FIG. 9. This may include automated fraud analysis (block 930) in which transactions are analyzed to determine (e.g. based on transaction patterns, amounts, journey details, and/or other information) whether fraud may be occurring. The MaaS interface 1 may also provide for analysis (block 935), responding to queries from mobility entities/managing authorities regarding various transactions. As previously noted, the MaaS interface 1 may be able to provide a variety of analytics of the ledger data. With regard to the functionality at block 940, the MaaS interface 1 may automatically track API performance as it receives API calls and provide automated reports of the performance to related entities, as shown at block 945. For example, the MaaS interface 1 may track data speed, quality, scheduling prioritization, occurrence of errors, and/or other metrics associated with the API performance of each member of the MaaS interface 1. The various members may view these reports to ensure that the performance metrics are substantially uniform for each member, which may help ensure that the interface 1 remains agnostic to the members and that no individual member is getting any preferential treatment that may provide the member with a market advantage. These reports may be scheduled (e.g. monthly) and/or ad-hoc.

Figure 10:
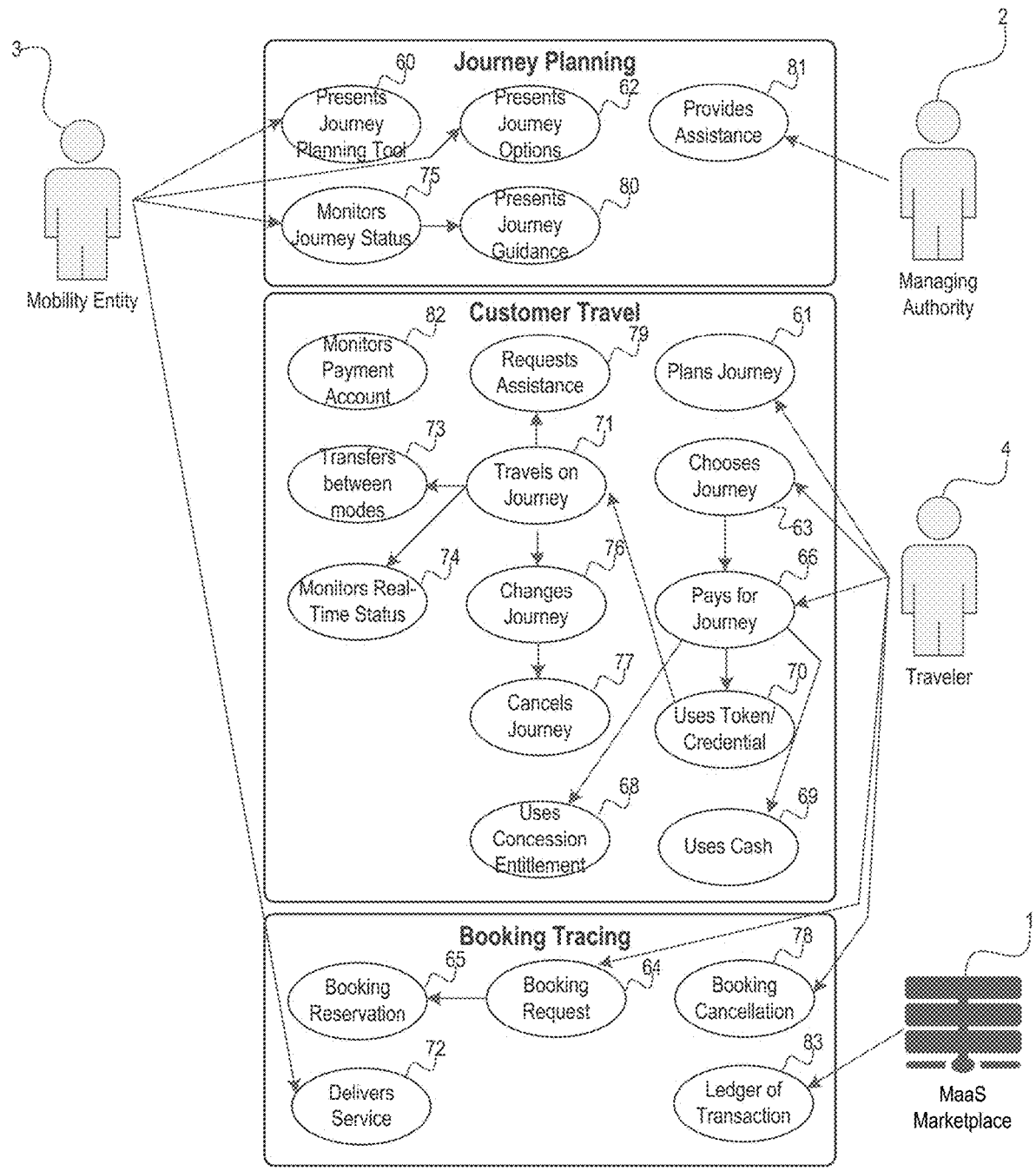
FIG. 10 depicts a journey planning, service availability, payments system, and invoicing system of the MaaS interface.

FIG. 10 is a diagram similar to FIGS. 2 and 6, showing one embodiment of how journey planning, service availability, payments, and invoicing of the MaaS interface 1 may be used by the managing authority 2, mobility entity 3, and MaaS interface 1 itself to provide Business to Consumer (B2C) journey planning within the MaaS interface 1. As with other figures, FIG. 10 is provided as a nonlimiting example. Alternative techniques for journey planning may be used in alternative embodiments.

Here, the process may begin with journey planning, where the mobility entity 3 presents a journey planning tool 60, enabling a traveler 4 to (e.g., via a mobile app or website) plan a journey 61. Based on the choices that the traveler 4 is making, the mobility entity 3 may present different journey options 62 to the traveler 4. The traveler 4 may then choose a journey 63 to take. As noted above, based on the chosen journey, there may or may not need to be a booking. If a booking is needed for a chosen journey, a booking request 64 may be made, resulting in a booking reservation 65.

The traveler 4 may then pay for the journey 66. In some instances, the traveler may be able to use a concession entitlement 68. A concession entitlement may be a certain type of discount available for certain types of travelers (e.g., seniors or students) that may lower the price of the journey. If the traveler chooses to use cash 69, the MaaS interface 1 may provide a mechanism to acknowledge the cash payment, such as in the form of an automated message sent to the traveler 4 and/or affected mobility entities 3. Otherwise, they may use an account to pay, as described in previous embodiments.

Once payment is received the traveler 4 may receive a token or credential for the journey. For example, the token may include a data packet and/or identifier (computer-readable and/or human readable, such as a virtual ticket, barcode, QR code, and/or other visible identifier) which may be displayed, transmitted (such as via Bluetooth, NFC, and/or other wireless interface), and/or otherwise provided by the traveler 4 to one or more mobility entities 3 to gain access to one or more mobility options or other modes of transport. The traveler 4 then uses the token or credential 70 and travels on the journey 71. This means the mobility entity 3 is delivering a service 72. In some journeys, different modes of transport may be used for different legs of the journey. In such instances, the traveler 4 may transfer between modes 73. The traveler 4 may use the same or a different token for some or all of the different modes of transportation utilized. The traveler 4 may also monitor their real-time status 74, which may be reflective of information provided by the mobility entity 3 (via a mobile app, for example), which also monitors journey status 75.

During the journey, changes may be made. For example, the traveler 4 may change the journey 76 (which may result in the process reverting back to the traveler 4 planning the journey 61). In other instances, changes to the journey may result in a cancellation of the journey 77. If the journey is canceled, the booking 78 may be canceled (if a booking was made). If a traveler 4 requests assistance 79 with some aspect of the journey, a mobility entity 3 may present journey guidance 80 and/or the managing authority 2 may provide assistance 81. Finally, the traveler 4 may monitor his or her payment account 82 to determine whether they were correctly charged, and the MaaS interface 1 may make ledger of the transaction 83.

Figure 11:
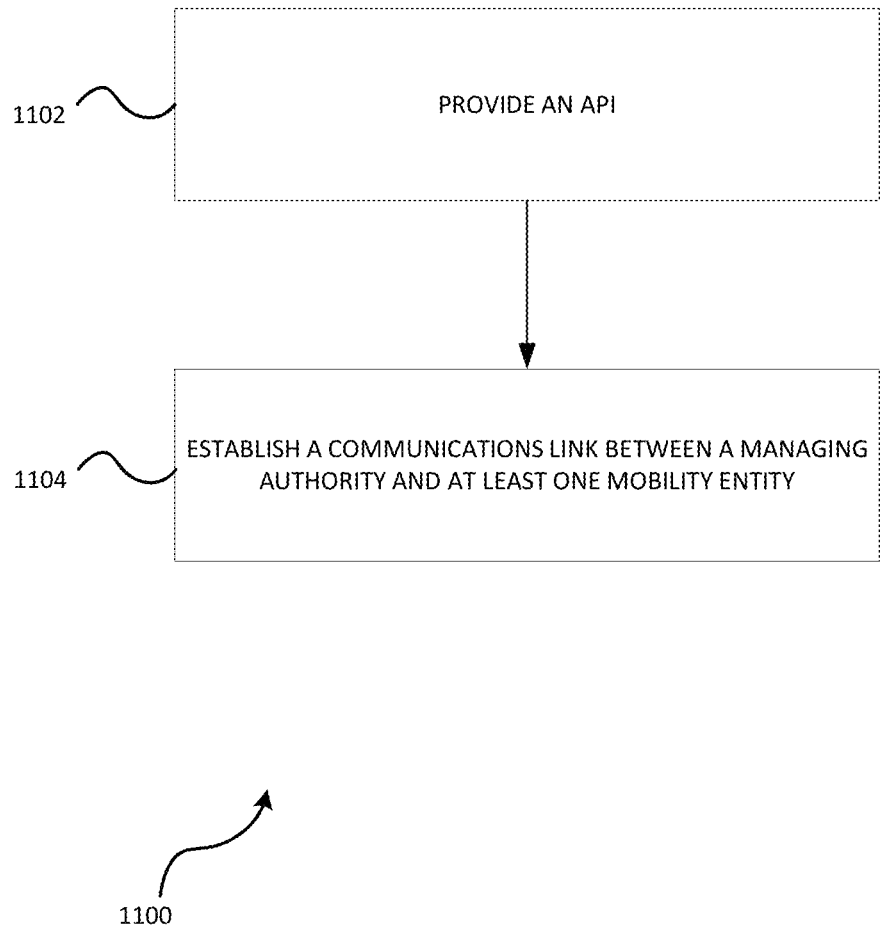
FIG. 11 is a flowchart of a process for operating an interface system according to embodiments of the present invention.

FIG. 11 is a flowchart depicting a process 1100 for operating an interface system, such as MaaS interface 1. Process 1100 may begin at operation 1102 by providing an application programming interface (API) that enables a managing authority system and a plurality of mobility entity systems (which may each provide at least one mode of transportation to travelers) to communicate with one another and with the interface system via a communications interface of the interface system. The API may enable the managing authority system and the plurality of mobility entity systems to communicate with one another without the need for the managing authority system or the individual mobility entity systems to program interfaces between each pair of systems.

The process 1100 may also include establishing a communications link between the managing authority system and at least one of the plurality of mobility entity systems at operation 1104. This may enable various functionality of the interface system. For example, the interface system may facilitate journey planning services for travelers (such as by a traveler accessing scheduling and reservation systems of at least one of the mobility entities via a website and/or software interface with the interface system), the ability to provide mobility (transit) services, and the ability to pay for such services. By integrating a number of mobility entities with the interface system, the planning and execution of multi-modal journeys is made possible with travelers only needing to access a single interface (the interface system). This provides a simplified and seamless user experience that eliminates the need for the traveler to directly access multiple mobility entity systems and/or other journey planning systems to plan, book, and complete a multi-modal journey.

In some embodiments, the process 1100 may include providing a managing authority the ability to upload one or more contracts, which may outline terms between the managing authority and/or one or more of the mobility entities. For each of the one or more contracts, the process 1100 may include selecting a contract type for the respective contract and activating the contract for use in the interface system. The process 1100 may include providing a mobility entity the ability to choose a contract of the one or more contracts and providing the managing authority the ability to approve the mobility entity for a chosen contract. This provides the managing authority (such as a transit authority, municipality, or other entity) control over operations of the various mobility entities. For example, the contracts may outline pricing, acceptable service areas/times, and/or provide the managing authority control over incentive/disincentive programs that enable the managing authority to steer mobility entity system operation in a manner that helps one or more policy goals off the managing authority.

In some embodiments, the process 1100 may include providing a transaction ledger in which information about events may be recorded. For example, information associated with planning a journey for a traveler, providing a mobility service for the traveler, paying for the mobility service, and/or other interactions with the interface system may be recorded in the transaction ledger. The ledger may serve as a centralized data repository that may be used to ensure interactions (such as journey planning, bookings, payments, etc.) between travelers, mobility entities, and/or the managing authority are tracked and properly reconciled. In some embodiments, the process 1100 may include providing analytics of data in the transaction ledger, such as statistics on the usage of various mobility entities, types of modes of transportation, congestion at various locations of a municipality, and the like. In some embodiments, the process 1100 may include performing a fraud analysis of the transaction ledger to determine whether any members of the interface system have performed any improper activities.

In some embodiments, process 1100 may allow new members to self-certify their systems for compatibility with the API of the interface system. For example, the interface system may perform and/or facilitate a test procedure for each of the plurality of mobility entity systems to check for a satisfactory connection with the API. As just one example, the testing entity may provide a number of predetermined API calls to the interface system, which may provide predetermined response values upon successful connection. A result of the test may enable each of the plurality of mobility entity systems to self-certify with the API. Upon proper self-certification, the interface system may issue and/or otherwise authorize a token for each of the plurality of mobility entity systems for use with the interface system. In some embodiments, the interface system may periodically and/or continuously monitor the API performance of each of the plurality of mobility entity systems to ensure that each mobility entity system is properly connected to the interface to maintain full compliance.

Figure 12:
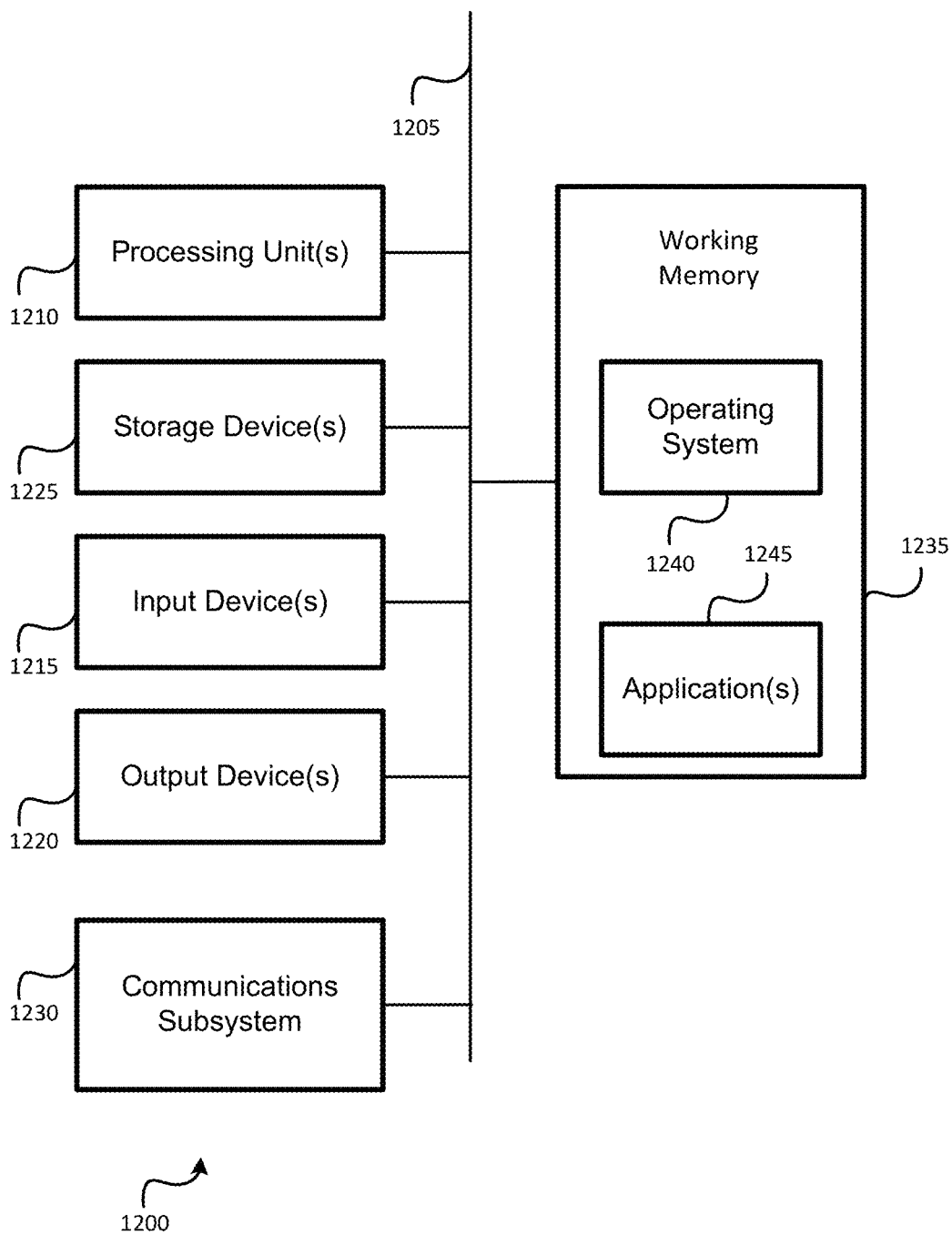
FIG. 12 is a block diagram of a computing system according to embodiments of the present invention.

FIG. 12 is a block diagram of computing device 1200, according to some embodiments of the present disclosure. As noted, a computing device 1200 as illustrated in FIG. 12 may, for example, function as and/or be integrated into a mobile device 210 or system (e.g., MaaS interface 1, public transportation system 160, vehicle management system 180, MaaS operator system 200, and/or managing authority system 220), which may be capable of performing some or all of the functions described in the embodiments above and/or the claims below. FIG. 12 provides a schematic illustration of one embodiment of a computing device 1200 that may perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computing device 1200 is shown comprising hardware elements that may be electrically coupled via a bus 1205, or may otherwise be in communication, as appropriate. The hardware elements may include one or more processors 1210, including without limitation one or more special-purpose processors such as digital signal processing chips, graphics acceleration processors (e.g., GPUs), CPUs, and/or the like; one or more input devices 1215, which may include without limitation a mouse, a keyboard, a camera and/or other sensors, and/or the like; and one or more output devices 1220, which may include without limitation a display device, a printer, and/or the like.

The computing device 1200 may further include and/or be in communication with one or more non-transitory storage devices 1225, which may include, without limitation, local and/or network accessible storage, and/or may include, without limitation, a disk drive, a drive array, an optical storage device, a solid-state storage device, such as a random access memory (RAM), and/or a read-only memory (ROM), which may be programmable, flash-updateable, and/or the like. Such storage devices may be configured to implement any appropriate data stores, including without limitation, various file systems, database structures, and/or the like.

The computing device 1200 might also include a communication subsystem 1230, which may enable computing device 1200 to communicate with other devices and/or networks. As such, the communications subsystem 1230 may include without limitation a modem, a network card (wireless or wired), an infrared communication device, a wireless communication device, and/or a chipset, and/or the like. This may include a wireless communications interface 1233, as shown.

The computing device 1200 also may include software elements, shown as being currently located within the working memory 1235, including an operating system 1240, device drivers, executable libraries, and/or other code, such as one or more application programs 1245, which may include computer programs provided by various embodiments (e.g., a web server, core software, etc.), and/or may be designed to implement methods, and/or configure systems, provided by other embodiments, as described herein. Merely by way of example, all or part of one or more procedures described with respect to the methods discussed above, and/or methods described in the claims, might be implemented as code and/or instructions executable by a computer and/or a processor within a computer. In an aspect, then, such code and/or instructions may be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computing device 1200. In other embodiments, the storage medium might be separate from a computer system e.g., a removable medium, such as a compact disc, and/or provided in an installation package, such that the storage medium may be used to program, configure, and/or adapt a general purpose computer with the instructions/code stored thereon. These instructions might take the form of executable code, which is executable by the computing device 1200 and/or might take the form of source and/or installable code, which, upon compilation and/or installation on the computing device 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computing device 1200 to perform methods in accordance with various embodiments of the technology. According to a set of embodiments, some or all of the procedures of such methods are performed by the computing device 1200 in response to processor(s) 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computing device 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An interface system comprising:
a communication interface;
one or more processing units communicatively coupled with the communication interface; and
a memory having instructions stored thereon that, when executed, cause the one or more processing units to:
provide an application programming interface (API) that enables a managing authority system and a plurality of mobility entity systems to communicate with one another and the interface system via the communications interface, wherein each of the mobility entity systems provides at least one mode of transportation;

establish a communications link between the managing authority system and at least one of the plurality of mobility entity systems to enable planning for one or more journeys by one or more users dynamically, based on real-time data, wherein the real time data includes updates on locations of one or more vehicles and schedules for the one or more journeys;

receive a request through the communication link for a self-provision test against the API from the plurality of the mobility entity systems;

perform a procedure associated with the self-provision test for each of the plurality of mobility entity systems to check for a connection with the API;

grant tokens to the plurality of mobility entity systems based on a result of the self-provision test; and authorize the plurality of mobility entity systems for usage of the API based on the tokens.

2. The interface system of claim 1, wherein:
the API enables the managing authority system and the plurality of mobility entity systems to communicate with one another without need to program interfaces between each pair of systems.

3. The interface system of claim 1, wherein the instructions further cause the one or more processing units to:
enable each of the plurality of mobility entity systems to self-certify with the API based on the self-provision test result.

4. The interface system of claim 3, wherein the instructions further cause the one or more processing units to:
monitor API performance of each of the plurality of mobility entity systems based on data speed, scheduling prioritization, occurrence of errors.

5. The interface system of claim 1, wherein the instructions further cause the one or more processing units to:
provide a transaction ledger configured to record events associated with one or more selected from a group comprising planning a journey for a traveler, providing a mobility service for the traveler, and paying for the mobility service.

6. The interface system of claim 5, wherein the instructions further cause the one or more processing units to:
provide analytics of data in the transaction ledger; and
perform a fraud analysis of the transaction ledger.

7. The interface system of claim 1, wherein the instructions further cause the one or more processing units to:
provide a managing authority the ability to upload one or more contracts and, for each of the one or more contracts:
select a contract type for the respective contract, and activate the contract for use in the interface system;
provide a mobility entity the ability to choose a contract of the one or more contracts; and
provide the managing authority the ability to approve the mobility entity for a chosen contract.

8. A method of operating an interface system, comprising:
providing an application programming interface (API) that enables a managing authority system and a plurality of mobility entity systems to communicate with one another and the interface system via a communications interface of the interface system, wherein each of the mobility entity systems provides at least one mode of transportation;
establishing a communications link between the managing authority system and at least one of the plurality of mobility entity systems to enable planning for one or more journeys by one or more users dynamically, based on real-time data, wherein the real time data includes updates on locations of one or more vehicles and schedules for the one or more journeys;
receiving a request through the communication link for a self-provision test against the API from the plurality of the mobility entity systems;
performing a procedure associated with the self-provision test for each of the plurality of mobility entity systems to check for a connection with the API;
granting tokens to the plurality of mobility entity systems based on a result of the self-provision test; and
authorizing the plurality of mobility entity systems for usage of the API based on the tokens.

9. The method of operating an interface system of claim 8, further comprising:
enabling each of the plurality of mobility entity systems to self-certify with the API based on the self-provision test result.

10. The method of operating an interface system of claim 8, further comprising:
monitoring API performance of each of the plurality of mobility entity systems based on data speed, scheduling prioritization, occurrence of errors.

11. The method of operating an interface system of claim 8, further comprising:
providing a transaction ledger configured to record events associated with one or more selected from a group comprising planning a journey for a traveler, providing a mobility service for the traveler, and paying for the mobility service.

12. The method of operating an interface system of claim 11, further comprising:
providing analytics of data in the transaction ledger.

13. The method of operating an interface system of claim 11, further comprising:
performing a fraud analysis of the transaction ledger.

14. The method of operating an interface system of claim 8, further comprising:
providing a managing authority the ability to upload one or more contracts and, for each of the one or more contracts:
selecting a contract type for the respective contract, and activating the contract for use in the interface system;
providing a mobility entity the ability to choose a contract of the one or more contracts; and
providing the managing authority the ability to approve the mobility entity for a chosen contract.

15. A non-transitory computer-readable medium having instructions stored thereon that, when executed by one or more processors of an interface system, cause the one or more processors to:
provide an application programming interface (API) that enables a managing authority system and a plurality of mobility entity systems to communicate with one another and the interface system via a communications interface of the interface system, wherein each of the mobility entity systems provides at least one mode of transportation;
establish a communications link between the managing authority system and at least one of the plurality of mobility entity systems to enable planning for one or more journeys by one or more users dynamically, based on real-time data, wherein the real time data includes updates on locations of one or more vehicles and schedules for the one or more journeys;
receive a request through the communication link for a self-provision test against the API from the plurality of the mobility entity systems;

perform a procedure associated with the self-provision test for each of the plurality of mobility entity systems to check for a connection with the API;

grant tokens to the plurality of mobility entity systems based on a result of the self-provision test; and authorize the plurality of mobility entity systems for usage of the API based on the tokens.

16. The non-transitory computer-readable medium of claim 15, wherein the instructions further cause the one or more processors to:

enable each of the plurality of mobility entity systems to self-certify with the API based on the self-provision test result.

17. The non-transitory computer-readable medium of claim 15, wherein the instructions further cause the one or more processors to:

monitor API performance of each of the plurality of mobility entity systems based on data speed, scheduling prioritization, occurrence of errors.

18. The non-transitory computer-readable medium of claim 15, wherein the instructions further cause the one or more processors to:

provide a transaction ledger configured to record events associated with one or more selected from a group comprising planning a journey for a traveler, providing a mobility service for the traveler, and paying for the mobility service.

19. The non-transitory computer-readable medium of claim 18, wherein the instructions further cause the one or more processors to:

provide analytics of data in the transaction ledger; and perform a fraud analysis of the transaction ledger.

20. The non-transitory computer-readable medium of claim 15, wherein the instructions further cause the one or more processors to:

provide a managing authority the ability to upload one or more contracts and, for each of the one or more contracts:

select a contract type for the respective contract, and activate the contract for use in the interface system;

provide a mobility entity the ability to choose a contract of the one or more contracts; and provide the managing authority the ability to approve the mobility entity for a chosen contract.

* * * * *